Dec. 10, 1963     B. R. HALPERN ETAL     3,113,342
MACHINE FOR OBTAINING IMAGES

Filed March 19, 1962     3 Sheets-Sheet 1

INVENTORS
BERNARD ROBERT HALPERN
JOSEPH PECK MCNUTT III

BY *Lynn Barrett Morris*

ATTORNEY

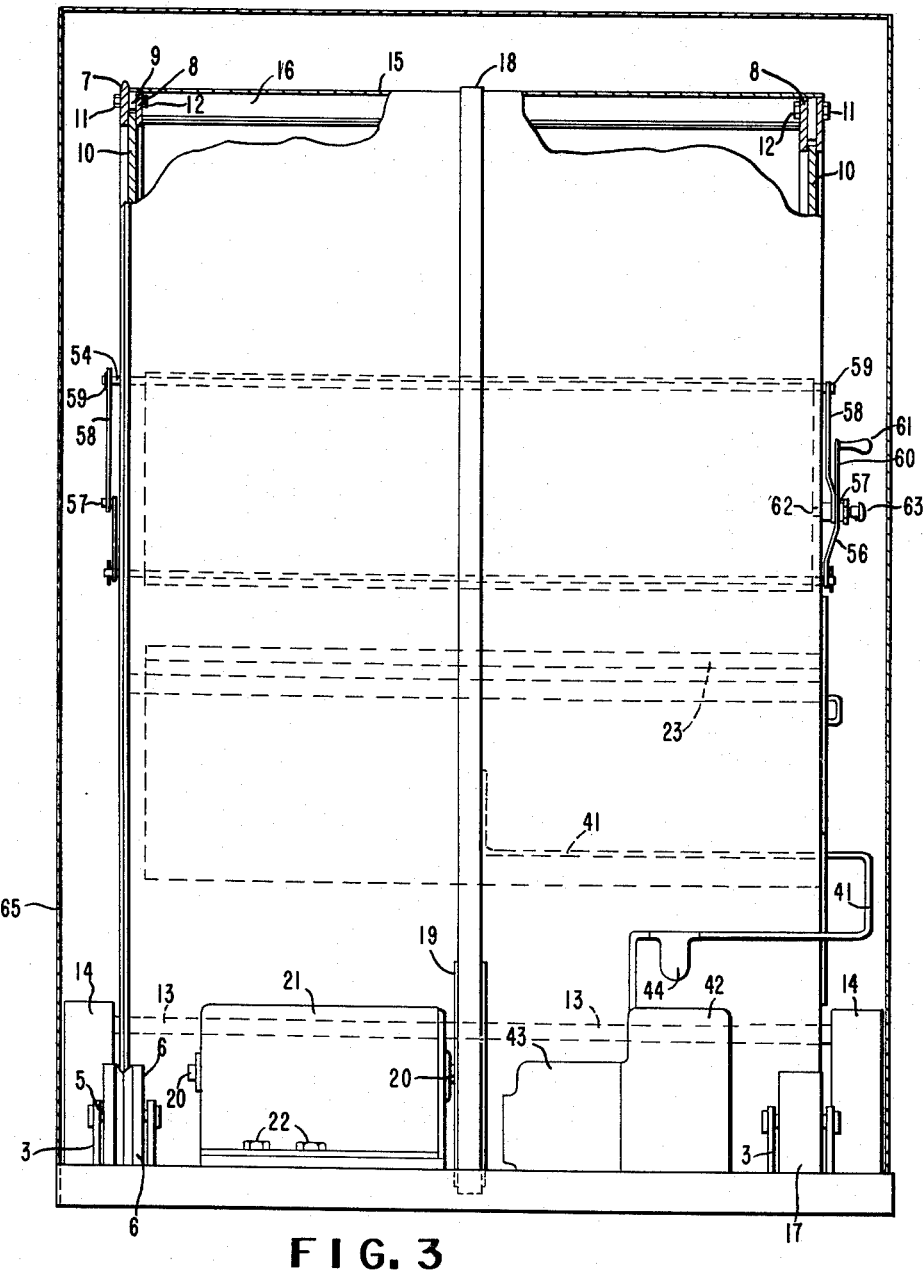

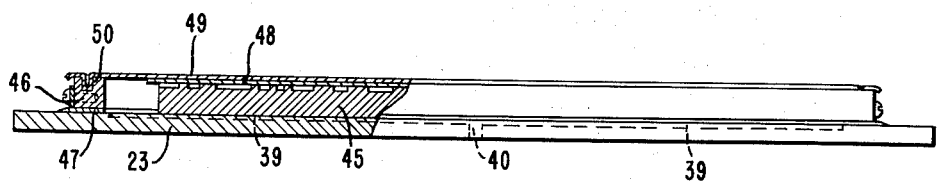
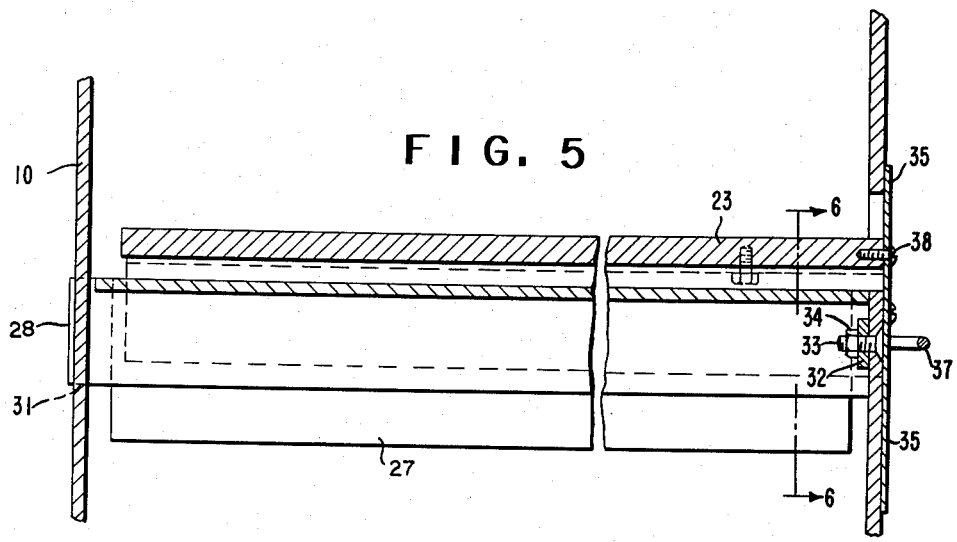
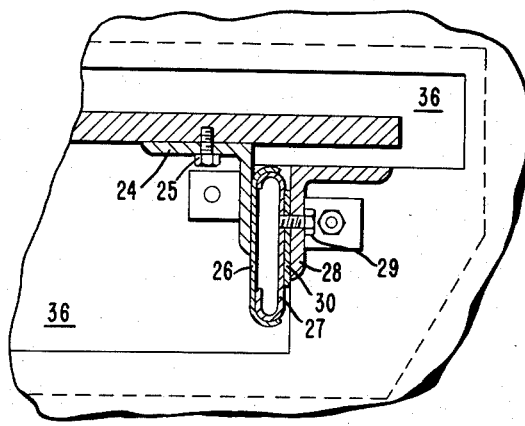

United States Patent Office 3,113,342
Patented Dec. 10, 1963

3,113,342
MACHINE FOR OBTAINING IMAGES
Bernard Robert Halpern, Swarthmore, Pa., and Joseph Peck McNutt, III, Newark, Del., assignors to E. I. du Pont de Nemours and Company, Wilmington, Del., a corporation of Delaware
Filed Mar. 19, 1962, Ser. No. 180,589
8 Claims. (Cl. 18—1)

This invention relates to a machine for obtaining a light-transmitting image of the surface of a printing form in an opaque pressure-sensistive film.

In assignee's Bechtold U.S. Patent 2,957,791 there are disclosed methods for selectively clarifying the opaque pressure-clearable films covered by said patent by pressing the films against a printing form, e.g., a block of type, an engraved metal plate or a photopolymerized line and/or halftone printing relief. An opaque, pressure-clearable film can be placed on the surface of the printing form in a proofing press and the roller then rolled over the film and the latter removed to reveal a clear image in the opaque background. The image-bearing film can then be colored or dyed with a suitable coloring material and the excess material removed. The clear areas, being non-porous, do not absorb the coloring material.

In assignee's Halpern U.S. application, Ser. No. 101,981 filed April 10, 1961, there are disclosed and claimed (1) a process for obtaining clear images in opaque pressure-clearable films by subjecting such a film while in contact with the relief surface of a printing form to a large number of individual impact forces of small area and magnitude, e.g., by means of steel balls, and (2) various types of apparatus useful in carrying out the process.

It is an object of this invention to provide a new and practical machine for obtaining clear images in opaque pressure-clearable films. Another object is to provide such a machine wherein the force of impact of small discrete impact elements can be adjusted. A further object is to provide such a machine that is simple to construct and operate and gives uniform, satisfactory results. A still further object is to provide such a machine that can be operated successfully by the ordinary technician. Still further objects will be apparent from the following description of the invention.

In principle, the machine of this invention comprises a rotatable drum having a plurality of buckets on its inner curved surface which are adapted to pick up, transport and discharge as a continuous hail, small impact elements, end walls and means for rotating the drum; characterized in that the drum contains (1) a vacuum plate carrying a printing form and a vacuum frame surrounding said form, and (2) an adjustable stationary screen above said plate and adapted to regulate the fall of the impact elements.

The novel machine of this invention will now be described with reference to the attached drawings which constitute a part of this application. In these drawings:

FIG. 3 is a lightly enlarged end elevation of the machine with parts in dashed outline and parts in section;

FIG. 4 is an enlarged elevation of the vacuum plate with a printing form, pressure-sensitive film vacuum frame and cover sheet in assembled relationship, parts being in section;

FIG. 5 is an enlarged side elevation of the vacuum frame and supporting members with parts in section, taken along the lines 5—5 of FIG. 1, and FIG. 6 is a view taken along the lines 6—6 of FIG. 5 of the vacuum plate and supporting members.

Figure 1:
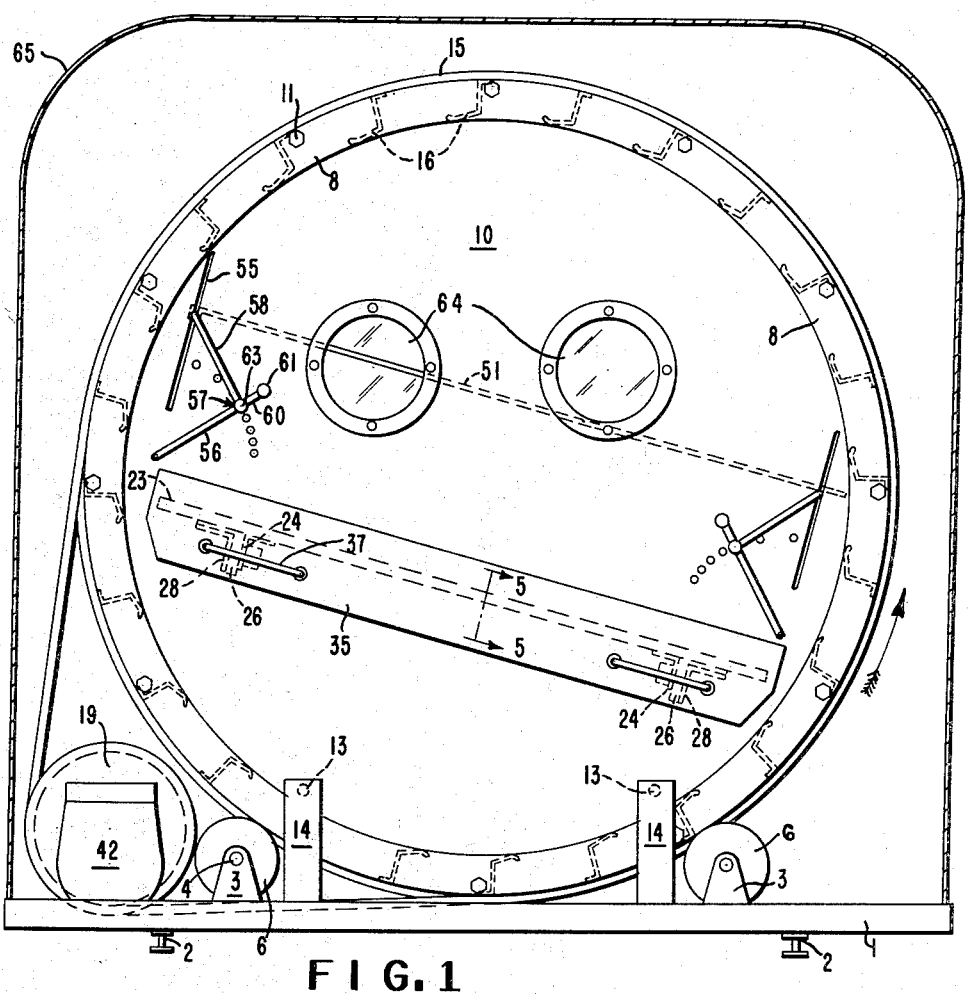
FIG. 1 is a front elevation of the machine with the inner parts, including a screen in dashed outline and the casing in section.

The machine of this invention as shown in the drawings, in one practical embodiment, comprises a flat base or frame member 1 having level adjustment screws 2 adjustably mounted near each of the four corners of the base. The outer surface of the heads of the screws are in contact with the bench, table, shelf floor or other supporting surface.

Near each of the left front and back corners of the base there are attached a pair of spaced bearing blocks 3 having bearings 4 adapted to receive a shaft 5 on which grooved support rollers 6 are rotatably mounted. These spaced support rollers are adapted to receive and prevent lateral movement of coacting annular outer frame ring 7. Adjacent this outer frame ring is an inner frame ring 8 of lesser diameter and between the frame rings there are spacers 9. The latter have an inner diameter greater than that of the frame rings. An end plate 10 fits into the space between the two frame rings. Bolts 11 extend through the frame rings and spacer rings and hold them in place by means of fastening nuts 12. The end plates are thinner than the spacers. These end plates are held in position by rods 13 fastened to end extending between suitable brackets 14 which are integral with, bolted, welded or otherwire affixed to the plates. The bottoms of the brackets are affixed to the base in any suitable construction.

The outer ring frame on the opposite end of the machine is of lesser diameter than the other one as it does not have to interfit with a support roller. Drum 15, which consists of a curved sheet or cylinder of sheet metal interfits with the outer surfaces of the inner ring frames and spacers and at one end with the outer ring frame member. On the inner curved surface of the drum there are mounted lateral bucket members 16. The base of these members can be welded to the drum surface or fastened by rivets, screws, bolts or other suitable fastening means (not shown). Similarly, the drum can be fastened to the annular rings by welds or in any other suitable manner.

The front end of the drum is supported by smooth surface rollers 17 which has a shaft extending through bearings in brackets, all like the back grooved rollers.

Belt 18 extends around the drum and drive pulley 19 that is mounted on drive shaft 20 of electric gear motor 21 which is fastened to base 1 by means of suitable bolts 22.

A vacuum plate 23 is located in the drum. It is supported by means of angle supports 24 one arm of which is attached to the bottom surface of the plate by machine screws 25 and the other of which is attached in like manner (screws not shown) to slidable channel support 26 having curved ends. Interfitting with the channel support is a fixed channel support 27 and it is fastened to a similar angle support 28 held in place by machine screws 29. As shown in FIG. 6, a shim 30 is placed between the slide member and supporting surface of the angle. If desired, portions of the curved ends can be removed and rollers [metal, nylon, etc.] positioned to rotate in the openings (all not shown) and contact the surface of coacting slidable channel support 26.

The back end of the stationary channel support 27 extends through slots 31 in the back endplate 10. The front end of said support, however, preferably can be attached to the front endplate 10 by a suitable bracket 32, e.g., by means of a bolt 33 and nut 34 and the other arm of the bracket attached to the channel support in like manner or by other equivalent fastening means. Vacuum plate 23 is fastened to vertical face plate 35 that overlaps with a T-shaped opening 36 in the front endplate (see FIG. 6 which is shown in horizontal rather than slanting position). The face plate is provided with a suitable handle 37 so that the vacuum plate, articles carried by it, and the channel slide member, can be removed (i.e., pulled out)

from the drum. The face plate is attached to the vacuum plate by means of suitable screws 38.

The vacuum plate can be made of aluminum, cast iron, bronze or other suitable cast metal or metal alloy or it can be pressed steel or aluminum sheet. The upper surface of the plate is provided with radial grooves 39 that communicate with a hole 40. The latter can be provided with a suitable fitting (not shown) that is connected to a rigid or flexible hose or pipe 41, which is preferably connected to a vacuum pump 42 driven by motor 43, both of which are fastened to the base plate in any suitable manner. A filter 44 can be provided in the vacuum line so that dust, metal and/or plastic particles can be removed from the system.

With specific reference to FIG. 4, a printing form 45 is carried by the vacuum plate. It is surrounded by a suitable vacuum frame 46. The bottom surface of this frame, like the surface of the plate, can be machined to have uniformly smooth, flat surfaces. Around the periphery of the frame is a resilient gasket 47 (e.g., made of rubber or a synthetic elastomer) that will provide a vacuum seal with the surface of the vacuum plate. An opaque pressure-sensitive film 48, or other thin image-recording sheet, is placed over the surface of the printing form and generally will be of lesser area than that of the vacuum frame. A thin, flexible, transparent sheet 49 is preferably placed over the vacuum frame and enclosed articles. It can be fastened to the frame in any suitable manner. For example, it can be forced into groove 50 in the surface of the sides and ends of the frame.

Figure 2:
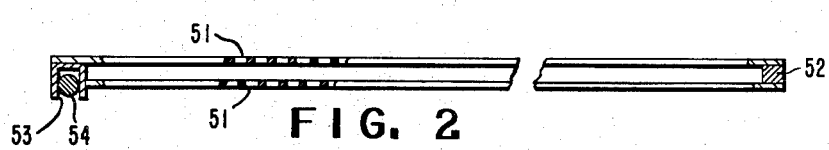
FIG. 2 is an enlarged elevation of the screen with parts in section.

A reticulated screen 51, e.g., woven mesh or expanded metal screen, is placed above the vacuum plate. It can be provided with a siutable narrow frame 52. The openings in the lower screen preferably are offset from those in the upper screen. As shown in FIG. 2, a screen is fastened to both the upper and lower surface of the frame. The screen can be spot-welded, tacked, stapled or fastened in any other suitable manner to the frame. One end of the frame can be an inverted channel 53 into which there is fitted a support rod 54 that extends through a slot 55 (diagonal) in the respective end plate of the apparatus. The other end of the frame can rest on a similar support rod that extends through similar slots in the end plates.

Levers 56 are pivotally mounted at one end on the outer surfaces of the end plates. These levers are provided with pivot pins 57 at or near their other ends which extend through pivot holes in link members 58, the other ends of which have pivot holes 59 through which the ends of the support rods extend and are suitably fastened to remain in operative relationship.

The levers on the front end plate have an extended portion 60 and fastened to them are handles 61. The upper pivot pins for said levers are preferably adjustable laterally and have a detent 62 that extends through suitable adjustment holes in the end plate. These pivot pins are preferably spring biased and the outer ends are provided with a knob 63 so that the detent end can be withdrawn from and inserted into the desired adjustment hole.

The end plate on the front end of the machine can be provided with a window, or plurality of windows, 64 so that the operation of the machine can be observed and necessary adjustments made in the position of the screen. A light and a suitable controlling switch (not shown) can be provided to aid in observing the operation of the machine.

As shown in FIGS. 1 and 3 of the drawings, the entire machine, controls and vacuum pump can be enclosed in a suitable casing 65. The front end of this casing is provided with a suitable opening so that the vacuum plate can be drawn. This opening should be large enough so that it will not block the observation windows in the end plate. The opening can, if desired, be provided with a suitable transparent cover sheet. The casing can be provided with a sound-absorbing lining (not shown), e.g., felt or glass wool.

The machine of this invention, as described above and illustrated in the drawings, can be operated somewhat as follows. With particular reference to FIGS. 1 and 3 of the drawings, a charge of the small, discrete impact pellets can be introduced into the drum in amount sufficient to fill the rising buckets to capacity. The vacuum frame is withdrawn from the interior of the drum by clasping the handles on the vertical face plate (35). A printing form is placed on the vacuum plate and preferably in the center of the vacuum frame and surrounded by spacing blocks (not shown) of the same thickness as the form. The opaque, pressure-sensitive film is then placed in contact with the surface of the printing form, the pressure-sensitive layer being in contact with the type face. The transparent cover sheet and frame is then placed over the assembled printing form and opaque, pressure-sensitive film, a vacuum applied and the vacuum plate and assembled articles pushed into the drum.

The screen is then adjusted to the desired position which depends upon the nature of the pressure-sensitive film, i.e., the amount of pressure required to clarify the film.

The motor for driving the belt and drum is then actuated by a suitable control switch. As the drum turns, the buckets are filled and carry the pellets upwardly. The impact elements fall out of the buckets in the form of a uniform hail and hit the screen, which changes their path somewhat and breaks their fall so that they proceed to fall in a regulated manner on the surface of the protective sheet over the opaque, pressure-sensitive film. The force of the impact can be varied by raising or lowering the screen.

During the operation of the machine, the operator can observe the hail of pellets and their fall onto the surface of the protective sheet. The operator also can make any necessary adjustments, e.g., in the speed of rotation of the drum or by adjusting the distance between the vacuum plate and the screen.

The rotation of the drum is then stopped by actuating a controlling switch or by an automatic timer. The vacuum plate and associated articles are then removed from the drum by withdrawing therefrom the plate by means of the handles on the face plate. The image is then inspected in the pressure-sensitive film. If a uniform, sharp image is obtained, the vacuum is released and the pressure-sensitive film containing the image is then removed and used to print or expose a photosensitive element, e.g., a photopolymerizable printing plate. If the image is not uniformly clear and sharp, the above operation can be extended.

In the machine as shown, the vacuum plate and screen are placed at a slight angle to insure that the impact elements bounce off the cover sheet.

As indicated above, the various structural parts of the machine can be made of conventional materials of construction. For most of the members and parts of the machine, metals and metal alloys are used, e.g., steel, steel alloys, brass, bronze, aluminum and titanium.

Various types of pressure-sensitive films can be used in the machine. Suitable such films are described in Bechtold U.S. Patents 2,846,727, 2,848,752 and 2,957,791, and in assignee's Bechtold application Ser. No. 63,953, Oct. 21, 1960.

After the clarified, or clear, images are formed in the opaque pressure-clearable films in accordance with this invention, the unclarified background areas can be increased in optical density by deposition of opaque material in such areas to provide a high contrast image-bearing layer. These areas being porous are readily coated or impregnated with colorants which fill the open cell voids. Any of the post-densification procedures described in assignee's Bechtold U.S. application Ser. No.

63,953 can be used. Thus, the selectively clarified coating can be post-densified in unchanged opaque background areas by in situ deposition of lead sulfide at 50° C. by immersing the coating in aqueous lead nitrate and sodium sulfide solutions with intermediate blotting with porous cardboard, washing in water and drying, which gives a dense, black background. Alternatively, the background areas can be post-densified by dyeing for several minutes with 2.5% aqueous solution of an after chromed dye, Colour Index No. 15,710, at 50° C. for several minutes.

The impact elements useful in the machines can be of spherical, spheroid, egg-shaped, or regular or irregular polyhedral shape, but free from sharp edges or points. They can be uniform or non-uniform in size and shape. The size can vary from less than 1/16 inch in the greatest diameter to about 1/4 inch or more in such dimension. The most suitable size depends upon a number of factors such as the particular material of which they are made and, therefore, their mass.

The pellets can be made of any impact-resistant material, that is, material hard enough to clear the pressure-clearable film by impact. Suitable materials include metals and metal alloys, e.g., steel, iron, lead, copper, brass, zinc, etc.; minerals, e.g. agate, marble and glass; natural and synthetic resins; plastic materials, etc. The materials preferably are not brittle, that is, they should not break or chip during use.

The protective cover sheet (49) can be made of various durable transparent materials which do no deform readily. Thus, it can be made of nylon, polyethylene terephthalate, polycarbonate and related dimensionally stable films having a relatively hard surface. The machine screen can be made of any conventional wear-resistant material. It is preferably made of steel wire and the openings preferably are square and a distance slightly larger than that of the greatest diameter of the impact elements. The screens can be made of titanium or its alloys or even of synthetic resins or plastics; e.g. nylon.

The machine of this invention can be used for the photomechanical conversion of practically any type of relief printing form, e.g., individual slugs, such as type, Linotype, copper engraving, electrotype, and photopolymer printing plates, and may consist of line, halftone or combined line and halftone plates. Intaglio plates can also be used in the machines but they furnish a right-reading positive image.

The machine of this invention has the advantage that it is simple in construction, has relatively few moving parts and is highly dependable in operation. When the machine is used as described above, it will faithfully reproduce in a relatively short time a printing relief, forming a clear, e.g., transparent, image of the relief in the opaque, pressure-sensitive layer of the pressure-sensitive film element.

Another advantage of the apparatus is that it is simple to make and construct, and requires very little adjustment during normal use.

A further advantage of the machine is that it enables one to control the impact forces of the impact elements, thus leading to uniformity of sharp images in the pressure-sensitive film. A still further advantage is the fact that the machine applies a uniform pressure over a non-planar surface which, if attempted on a press, would require extension makeready, particularly on halftones. Still further advantages of the machine will be apparent from the foregoing specification and the accompanying drawings for this application.

We claim:

1. A machine comprising a rotatable drum having a plurality of buckets on its curved inner surface adapted to pick up, transport and discharge as a hail, small discrete impact elements, end walls and means for rotating the drum; characterized in that the drum contains:
   (1) a vacuum plate for holding a printing form and a vacuum frame surrounding such form, and
   (2) an adjustable stationary screen above said plate and adapted to regulate the fall of said impact elements.

2. A machine for forming clear images in an opaque pressure-clearable film comprising a rotatable drum having a plurality of buckets on its curved inner surface adapted to pick up, transport and discharge as a hail, small, discrete impact elements, non-rotatable end walls for the drum and means for rotating said drum characterized in that the drum contains
   (1) a removable vacuum plate for holding a printing form and a vacuum frame surrounding said form, and
   (2) an adjustable screen above said plate and adapted to regulate the fall of said impact elements toward the surface of said printing form.

3. A machine according to claim 2 wherein said vacuum plate is slidably mounted so that it can be inserted into and withdrawn from said drum.

4. A machine according to claim 2 wherein said vacuum plate is disposed at a slight angle to the horizontal and is slidably mounted so that it can be inserted into and withdrawn from said drum.

5. A machine according to claim 2 wherein said vacuum plate is disposed at a slight angle to the horizontal and is slidably mounted so that it can be inserted into and withdrawn from said drum, and has fastened thereto a thin, transparent protective cover for said printing form.

6. A machine according to claim 2 provided with levers for adjusting the screen at different distances above the surface of the printing form and means for locking the lever in respective locations.

7. A machine according to claim 2 provided with means for inducing a vacuum in said vacuum frame.

8. A machine according to claim 2 provided with a charge of small, discrete impact elements having curved surfaces.

References Cited in the file of this patent

UNITED STATES PATENTS

| | | |
|---|---|---|
| 2,483,584 | Lesavoy | Oct. 4, 1949 |
| 2,733,550 | Hollingsworth | Feb. 7, 1956 |
| 2,849,752 | Leary | Sept. 2, 1958 |
| 3,072,964 | Tilden | Jan. 15, 1963 |